United States Patent [19]

Sasaki et al.

[11] Patent Number: 4,943,829

[45] Date of Patent: Jul. 24, 1990

[54] IMAGE FORMING APPARATUS

[75] Inventors: Kenji Sasaki, Takarazuka; Mitsuo Matsushita, Higashiosaka; Kenzo Ono, Osaka; Akihiro Horiwaki; Katsunori Fujii, both of Higashiosaka; Hiroyuki Hatano, Nishinomiya, all of Japan

[73] Assignee: Mita Industrial Co., Ltd., Osaka, Japan

[21] Appl. No.: 400,206

[22] Filed: Aug. 29, 1989

[30] Foreign Application Priority Data

| | | | |
|---|---|---|---|
| Aug. 31, 1988 | [JP] | Japan | 63-114390[U] |
| Aug. 31, 1988 | [JP] | Japan | 63-114391[U] |
| Oct. 28, 1988 | [JP] | Japan | 63-141468[U] |

[51] Int. Cl.[5] .............. B60B 21/00

[52] U.S. Cl. .............. 355/215; 118/652; 355/245; 355/298

[58] Field of Search .............. 355/245, 246, 200, 215, 355/251, 252, 253, 254, 298; 118/653, 654, 655, 656, 657, 658

[56] References Cited

U.S. PATENT DOCUMENTS

| | | | |
|---|---|---|---|
| 3,695,224 | 8/1972 | Royka | 355/254 X |
| 3,900,002 | 8/1975 | Stange | 118/637 |
| 4,168,901 | 9/1979 | Ito et al. | 355/215 |
| 4,387,982 | 7/1983 | Stanley | 118/653 X |
| 4,483,606 | 11/1984 | Kuwako et al. | 355/215 |
| 4,506,972 | 3/1985 | Murakami et al. | 355/215 |
| 4,676,192 | 6/1987 | Yuge et al. | 355/251 X |

*Primary Examiner*—A. T. Grimley

*Assistant Examiner*—John E. Barlow, Jr.

*Attorney, Agent, or Firm*—Armstrong, Nikaido, Marmelstein, Kubovcik & Murray

[57] ABSTRACT

An image forming apparatus for forming an image by developing a latent image on a photoconductor drum with developer delivered from a developer unit disposed facing the photoconductor drum, comprising a developer collecting member that is integrally molded with a pair of photoconductor drum supporting side plates which rotatably support the photoconductor drum, and that is disposed between the photoconductor drum supporting side plates so as to collect the developer falling from between the photoconductor drum and the developer unit.

11 Claims, 8 Drawing Sheets

IMAGE FORMING APPARATUS

BACKGROUND OF THE INVENTION

1. Field of the Invention:

The present invention relates to an image forming apparatus such as an electrophotographic copying machine or the like, for forming an image by developing a latent image formed on a photoconductor drum with developer delivered from a developer unit. More particularly, the invention relates to an image forming apparatus wherein the scattering of developer falling through the clearance between the photoconductor drum and the developer unit is prevented.

2. Description of the Prior Art:

In an image forming apparatus such as an electrophotographic copying machine, printer, or the like, an electrostatic latent image is formed, as shown in FIG. 7, on a photoconductor drum 51 (rotating in the clockwise direction as shown by the arrow B in the drawing), the electrostatic latent image then being developed with developer delivered from a developer unit 60, after which the image formed on the photoconductor drum 51 is transferred to copy paper to form a copy image. The developer unit 60 is provided with a developing sleeve 61 (rotating in the counterclockwise direction as shown by the arrow A in the drawing), which is disposed in a housing 62 and in a location facing the photoconductor drum 51, the developing sleeve 61 having a magnetic brush formed thereon to carry developer to the photoconductor drum 51.

The housing 62 of the developer unit 60 is so disposed that a slight clearance is created with respect to the photoconductor drum 51. As a result, part of the developer being carried by the magnetic brush provided on the circumferential surface of the developing sleeve 61 may fall downward through the clearance between the photoconductor drum 51 and the housing 62 to be scattered in a copy paper conveyance path beneath the developer unit 60. The developer scattered in the copy paper conveyance path will adhere to the copy paper conveyed thereto and therefore stain the copy paper. If an image is transferred to the stained copy paper, the transferred image will come out blurred.

To prevent the above problem, a developer collecting member 80 for collecting the developer falling through the clearance between the photoconductor drum 51 and the housing 62 of the developer unit 60 is disposed beneath the position at which the photoconductor drum 51 faces the developer unit 60. Generally, the photoconductor drum 51 is rotatably supported between a pair of photoconductor drum supporting side plates 52, each having in the lower part thereof a supporting portion **52*a* so formed as to protrude toward the developer unit. The developer collecting member 80 is so mounted as to stretch between the supporting portions 52*a* of the photoconductor drum supporting side plates 52, each end thereof being secured to the corresponding supporting portion 52*a* with a screw 82 or the like. The developer falling from between the photoconductor drum 51 and the developer unit 60 is collected on the developer collecting member 80, thus preventing the developer from being scattered in the copy paper conveyance path beneath the developer collecting member 80**.

Conventionally, the developer collecting member 80 is formed from sheet metal into such a shape as to prevent the collected developer from dropping. Since the developer collecting member 80 is formed from such sheet metal, when each end of the developer collecting member 80 is secured to the supporting portion **52*a* of the corresponding photoconductor drum supporting side plate 52 by a screw 82, the entire developer collecting member 80 may be twisted depending on the tightening condition of the screw 82. If the developer collecting member 80 is mounted in a twisted state, the pair of photoconductor drum supporting side plates 52 may be disaligned with each other, and the photoconductor drum 51 may not be properly supported between the photoconductor drum supporting side plates 52. If the photoconductor drum 51 is supported between the disaligned photoconductor drum supporting side plates 52, the photoconductor drum 51 may not be properly positioned with respect to the developer unit 60. If the photoconductor drum 51 is not properly positioned with respect to the developer unit 60, the electrostatic latent image on the photoconductor drum 51 will not be developed by the developer unit 60**.

In recent years, there have been image forming apparatuses developed, that are capable of forming a multicolor image using developers of different colors such as black and red. Some of such image forming apparatuses comprise, as shown in FIG. 8, a main developer unit 60 for developing an electrostatic latent image on the photoconductor drum 51, for example, with a black developer, and a sub developer unit 70 for developing the latent image on the photoconductor drum 51, for example, with a red developer, the sub developer unit 70 being disposed above the main developer unit 60, both facing the photoconductor drum 51 (rotating in direction B). The main developer unit 60 and the sub developer unit 70 are respectively provided with developing sleeves (rotating in direction A) 61 and 71 disposed in respective housings 62 and 72 and facing the photoconductor drum 51, the housings 62 and 72 being swingable about respective fulcrums 63 and 73 to move the respective developing sleeves 61 and 71 close to and away from the photoconductor drum 51. When the developing sleeves 61 and 71 are moved close to the photoconductor drum 51 and positioned in the developing position, the developer units 60 and 70 develop the latent image on the photoconductor drum using the developing sleeves 61 and 71. On the other hand, in the receding position away from the photoconductor drum 51, the developer units 60 and 70 do not develop the latent image on the photoconductor drum 51, the developing sleeves 61 and 71 being inoperative.

In such image forming apparatuses, wherein the main developer unit 60 and the sub developer unit 70 are disposed one above the other, developer collecting members 81 and 81 are disposed, one beneath the position at which the main developer unit 60 faces the photoconductor drum 51 and the other beneath the position at which the sub developer unit 70 faces the photoconductor drum 51.

In the above case, it is necessary to position the developer collecting members 81 and 81 so that they do not interfere with the corresponding developer units 60 and 70 even when the developer units 60 and 70 are swung to the receding position away from the photoconductor drum 51. As a result, when the developer units 60 and 70 are positioned at the developing position close to the photoconductor drum 51, a large clearance is created between the developer collecting members 81 and 81 and the housings 62 and 72 of the respective developer units 60 and 70. If the clearance is enlarged between the housings 62 and 72 of the developer units 60 and 70 and the respective developer collecting members 81 and 81, the developer falling through the clearance between the photoconductor drum 51 and the developer units 60 and 70 will not be completely collected by the respective developer collecting members 81 and 81, resulting in the scattering of developer below the developer collecting members 81 and 81. Also, if the clearance is enlarged between the housings 62 and 72 of the developer units 60 and 70 and the respective developer collecting members 81 and 81, air may flow through the clearance and cause the developer collected on the developer collecting members 81 to fly around. Providing larger size developer collecting members 81 may be considered to prevent the developer from scattering therebelow, even when the developer units 60 and 70 are positioned in the receding position away from the photoconductor drum 51, but, since the clearance between the photoconductor drum 51 and the developer units 60 and 70 varies with the swinging motion of the developer units 60 and 70, it is not possible to completely prevent the developer from scattering downward with the provision of the developer collecting members 81 and 81.

SUMMARY OF THE INVENTION

The image forming apparatus of this invention, which overcomes the above-discussed and numerous other disadvantages and deficiencies of the prior art, is an image forming apparatus for forming an image by developing a latent image on a photoconductor drum with developer delivered from a developer unit disposed facing the photoconductor drum, comprising a developer collecting member that is integrally molded with a pair of photoconductor drum supporting side plates which rotatably support the photoconductor drum, and that is disposed between the photoconductor drum supporting side plates so as to collect the developer falling from between the photoconductor drum and the developer unit.

In a preferred embodiment, the developer collecting member has an upwardly extending wall on the side nearer to the developer unit.

In a preferred embodiment, the developer unit is movable between a developing position close to the photoconductor drum and a receding position away from the photoconductor drum, while the developer collecting member is provided with a seal member which flexes following the movement of the developer unit to always cover the clearance between the developer collecting member and the developer unit.

In a preferred embodiment, the seal member is attached to the outer surface, that is the side nearer to the developer unit, of the wall of the developer collecting member.

In a preferred embodiment, the seal member is attached to the inner surface, that is the side nearer to the photoconductor drum, of the wall of the developer collecting member.

In a preferred embodiment, the seal member is detachable from the developer collecting member.

In a preferred embodiment, the seal member is connected to the developer unit in a slidable way so as to follow the movement of the developer unit.

In a preferred embodiment, the seal member is detachably connected to the developer unit.

In a preferred embodiment, the seal member is attached to a mounting guide which is slidingly mounted on and detached from the developer collecting member.

In a preferred embodiment, the seal member is slidably connected to a supporting guide which is detachable from the developer unit.

In a preferred embodiment, the image forming apparatus is provided with a plurality of developer units, the developer collecting members being disposed beneath the respective positions at which the developer units face the photoconductor drum.

Thus, the invention described herein makes possible the objectives of (1) providing an image forming apparatus of the present invention in which a specified positional relationship is always provided between the photoconductor drum and the developer collecting member that collects the developer falling through the clearance between the photoconductor drum and the developer unit, and, accordingly the photoconductor drum is readily positioned in a specified position with respect to the developer unit; (2) providing an image forming apparatus in which the photoconductor drum is easily supported between the pair of photoconductor drum supporting side plates; (3) providing an image forming apparatus in which the developer falling from between the photoconductor drum and the developer unit is properly prevented by means of the seal member, from scattering below the developer unit even when the clearance changes between the photoconductor drum and the developer unit as the developer unit moves; (4) providing an image forming apparatus in which the sealing performance of the seal member is further improved by connecting it in such a way as to follow the movement of the developer unit; and (5) providing an image forming apparatus in which the seal member is easily replaceable by detachably attaching it to the developer collecting member, the seal member not interfering with the mounting and removing of the developer unit to and from the image forming apparatus body.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Example 1

Figure 1:
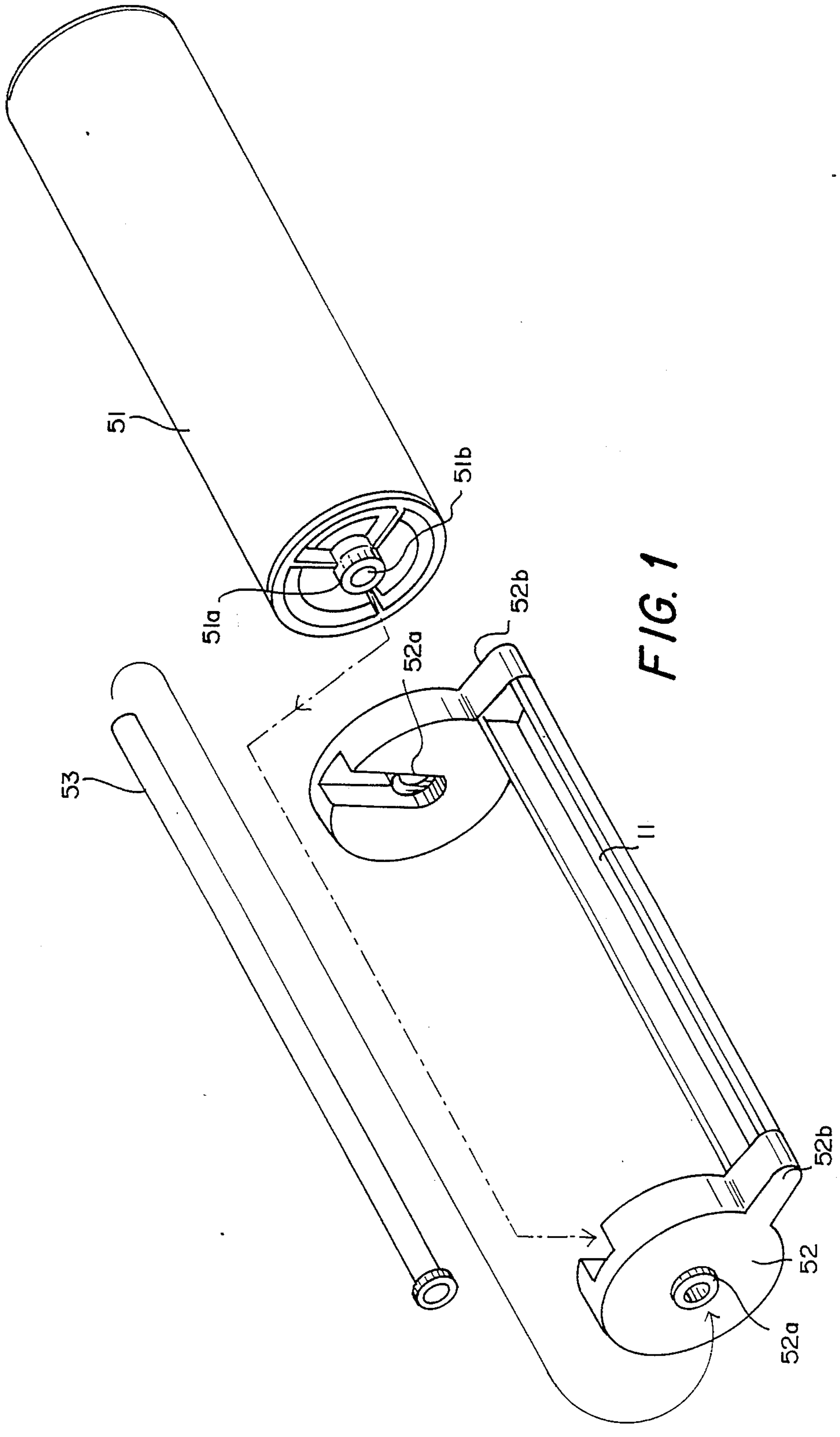
FIG. 1 is a perspective view showing portions of an image forming apparatus, with a photoconductor drum detached therefrom of the present invention.

FIG. 1 is a perspective view showing a photoconductor drum and its adjacent parts, with the photoconductor drum detached, of an image forming apparatus according to a first embodiment of the present invention. In the image forming apparatus, the developer unit (not shown) is disposed facing a photoconductor drum 51, the developer unit being used to develop a latent image formed on the photoconductor drum 51 with developer. A developer collecting member 11 is disposed beneath the position at which the photoconductor drum 51 faces the developer unit (not shown). The developer collecting member 11 which collects the developer falling through the clearance between the photoconductor drum 51 and the developer unit is disposed in such a way as to connect a pair of photoconductor drum supporting side plates 52 which rotatably support the photoconductor drum 51. Each photoconductor drum supporting side plate 52 is formed in a disc shape with a rotation shaft supporting hole 52*a* formed in the center thereof.

On the lower part of each photoconductor drum supporting side plate 52 is formed a supporting portion 52*b* which is disposed facing the photoconductor drum 51 and protruding toward the developer unit. The developer collecting member 11 is integrally molded with the photoconductor drum supporting plates 52, using plastic, etc., the developer collecting member 11 being disposed to connect the two supporting portions 52*b*. Therefore, the two photoconductor drum supporting side plates 52 and the developer collecting member 11 combine to form an integrally molded frame-like construction, thus the photoconductor drum supporting side plates 52 being firmly connected with each other without going out of alignment with respect to each other.

The developer collecting member 11 is a box-shape hollow construction with an open top, and the developer falling through the clearance between the photoconductor drum 51 and the developer unit is collected in the developer collecting member 11.

A flange 51*a* is fitted into each end of the photoconductor drum 51, the flange 51*a* being provided with a rotation shaft mounting hole 51*b* formed in the center thereof. The photoconductor drum 51 is put into an assembly in the following manner. First, the photoconductor drum 51 is positioned between the two photoconductor drum supporting side plates 52, and a rotation shaft 53 is put through the rotation shaft supporting hole 52*a* of one photoconductor drum supporting side plate 52, to be inserted in the rotation shaft mounting holes 51*b* of the flanges 51*a* fitted to the photoconductor drum 51. The rotation shaft 53 is then fixed to the flanges 51*a*, thus being made integrally rotatable with the photoconductor drum 51. After that, the rotation shaft 53 is inserted in the rotation shaft supporting hole 52*a* of the other photoconductor drum supporting side plate 52, thus being rotatably supported in the rotation shaft supporting holes 52*a* of the two photoconductor drum supporting side plates 52.

In this embodiment, since the two photoconductor drum supporting side plates 52 are integrally molded with the developer collecting member 11 which firmly connects them together, the photoconductor drum 51 is able to be smoothly and quickly supported on the photoconductor drum supporting side plates 52 via the rotation shaft 53. Since it is not necessary to use screws to fix the developer collecting member 11 to the photoconductor drum supporting side plates 52, the assembling work efficiency of the photoconductor drum is further improved.

Example 2

Figure 2:
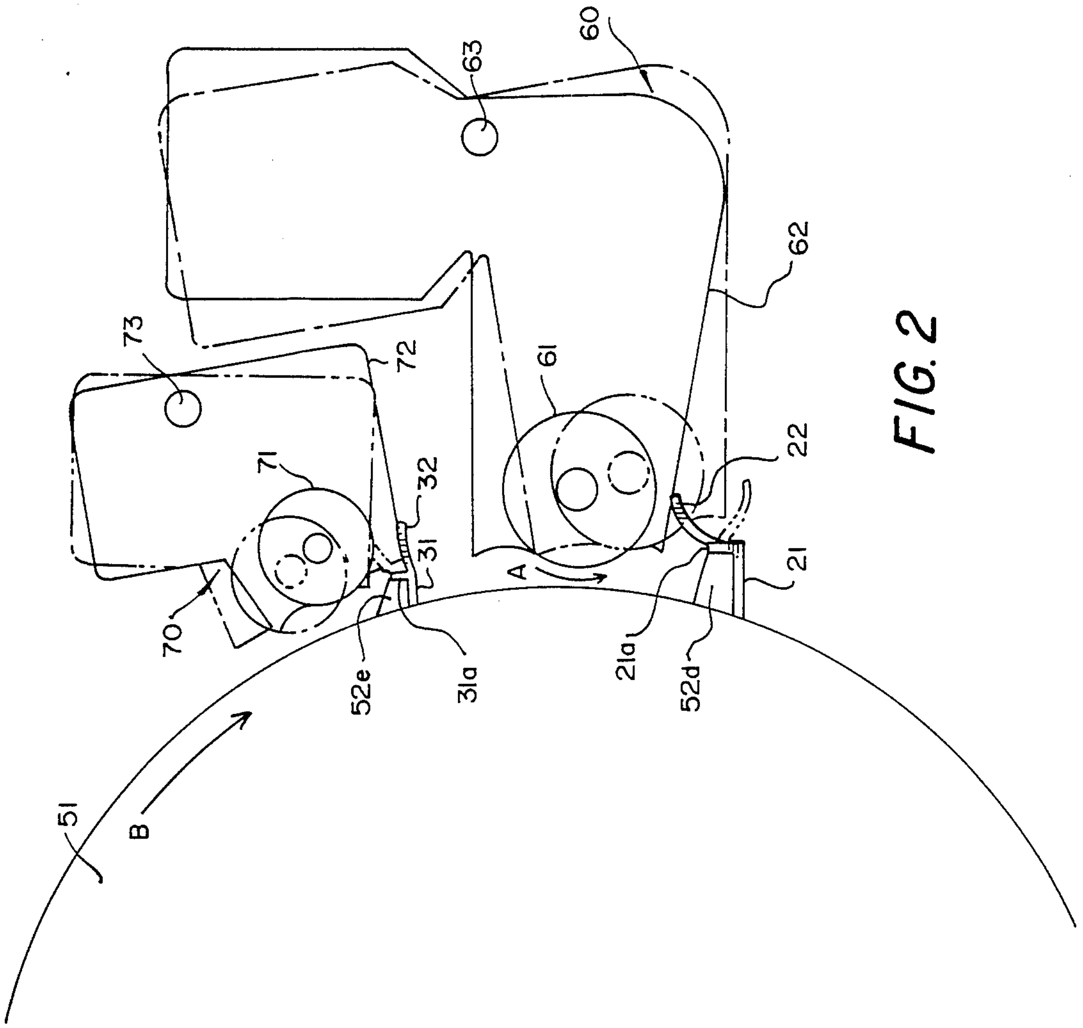
FIG. 2 is a schematic diagram showing the main portions of another image forming apparatus of the present invention.

An image forming apparatus in this embodiment is provided, as shown in FIG. 2, with two developer units 60 and 70. The developer units 60 and 70 are disposed one above the other, each facing the photoconductor drum 51. The developer unit 60 in the lower position is used to develop a latent image on the photoconductor drum 51, for example, with black developer. The sub developer unit 70 disposed above the main developer unit 60 is used to develop the latent image on the photoconductor drum 51 with a developer of a different color from the developer of the main developer unit 60, for example, with red developer.

The main developer unit 60 is provided in the housing 62 with a developing sleeve 61 disposed rotatably in the counterclockwise direction indicated by the arrow A in the drawing in a location facing the photoconductor drum 51. The developing sleeve 61 is rotated to form a magnetic sleeve on its circumferential surface to carry developer. The main developer unit 60 is swingable about a fulcrum 63 between a developing position (indicated by a solid line in FIG. 2) and a receding position (indicated by a dash-dot line in FIG. 2), the developing position being the position where the developing sleeve 61 is positioned close to the photoconductor drum 51 so that the developer on the magnetic brush contacts the photoconductor drum 51, and the receding position being the position where the developing sleeve 61 is positioned away from the photoconductor drum 51 so that the magnetic brush does not contact the photoconductor drum 51.

The sub developer unit 70 disposed above the main developer unit 60 is also provided in the housing 72 with a developing sleeve 71 disposed facing the photoconductor drum 51, the sub developer unit 70 being swingable about a fulcrum 73 in the same way as the main developer unit 60 between a developing position (indicated by a line of dashed and double dots in FIG. 2) where the developing sleeve 71 is positioned close to the photoconductor drum 51 and a receding position (indicated by a solid line in FIG. 2) where the developing sleeve 71 is positioned away from the photoconductor drum 51. Either the main developer unit 60 or the sub developer unit 70 is selected, and moved to the developing position to develop the latent image on the photoconductor drum 51.

A developer collecting member 21 is disposed beneath the position at which the developing sleeve 61 of the main developer unit 60 faces the photoconductor drum 51, while a developer collecting member 31 of a similar construction is disposed above the main developer unit 60 and beneath the position at which the developing sleeve 71 of the sub developer unit 70 faces the photoconductor drum 51.

Figure 3:
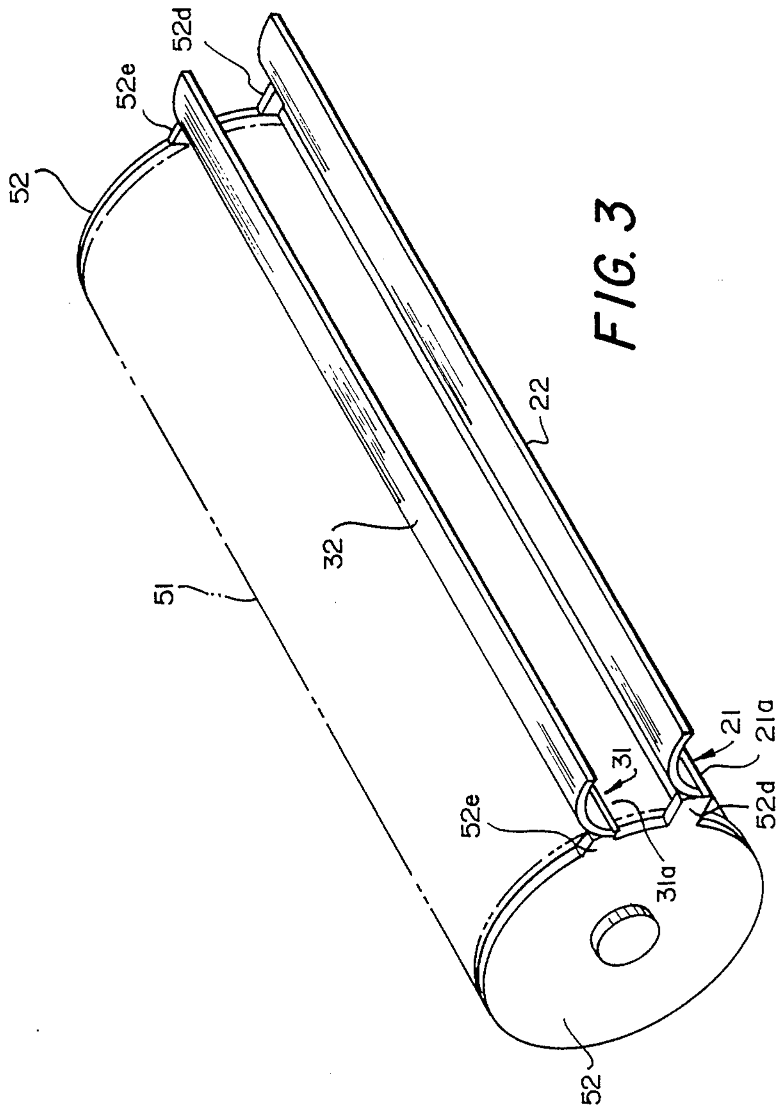
FIG. 3 is a perspective view showing a portion of FIG. 2.

Like the developer collecting member 11 in the foregoing first embodiment, the developer collecting members 21 and 31, are integrally molded with a pair of photoconductor drum supporting side plates 52 and 52 (FIG. 3). As shown in FIG. 3, the developer collecting members 21 and 31 are disposed respectively as connecting supporting portions **52*d*—52*d* and 52*e*—52*e* formed on the photoconductor drum supporting side plates 52 and protruding toward the main developer unit 60 and the sub developer unit 70, respectively. The developer collecting members 21 and 31 are respectively provided with vertical wall portions 21*a* and 31*a* upwardly extending toward the side edge portions of the main developer unit 60 and the sub developer unit 70 respectively, the wall portions 21*a* and 31*a* being so disposed that they do not contact the housings 62 and 72 even when the main developer unit 60 and the sub developer unit 70** are moved to their respective receding positions.

To the outer surfaces of the wall portions **21*a* and 31*a* of the developer collecting members 21 and 31 are attached the base portions of seal members 22 and 32 along the entire length of the wall portions 21*a* and 31*a* respectively. The seal members 22 and 32 are formed of a flexible material, the edge portions thereof respectively contacting the undersides of the respective housings 62 and 72 of the main developer unit 60 and the sub developer unit 70. When the main developer unit 60 and the sub developer unit 70 are moved to their respective receding positions, the respective seal members 22 and 32 are flexed to follow the movement of the developer units 60 and 70 with the edge portions thereof respectively contacting the undersides of the housings 62 and 72. Thereafter when the main developer unit 60 and the sub developer unit 70 are moved to the respective developing positions, the respective seal members 22 and 32 flex by their own resilience to follow the movement of the developer units 60 and 70 with the edge portions thereof respectively contacting the undersides of the housings 62 and 72**.

Since the clearance between the photoconductor drum 51 and each of the main developer unit 60 and sub developer unit 70 is always sealed by the seal members 22 and 32, the developer falling through the clearance is securely collected on the developer collecting members 21 and 31 without being scattered therebelow. Also, since the seal members 22 and 32 seal the clearance between the photoconductor drum 51 and each of the main developer unit 60 and sub developer unit 70 to block the circulation of air therethrough, there is no possibility that the developer collected on the developer collecting members 21 and 31 will fly around. Furthermore, the seal member 32 disposed beneath the sub developer unit 70 prevents the developer in the sub developer unit 70 from being scattered downward, and therefore prevents the developer in the sub developer unit 70 from getting mixed in the developer of different color in the main developer unit 60 disposed beneath the sub developer unit 70, thus eliminating the possibility of deteriorating the color of the image developed by the main developer unit 60.

For this embodiment, an image forming apparatus having two developer units has been described, but this embodiment is also applicable to one having three or more developer units, for example, a full-color image forming apparatus. This embodiment is also applicable to an image forming apparatus having a single developer. The developer units of the image forming apparatus according to this embodiment are so constructed that they move to the developing and receding positions by swinging motion, but alternatively, they may be constructed to achieve the same objects by reciprocal movement in parallel directions.

Example 3

Figure 4:
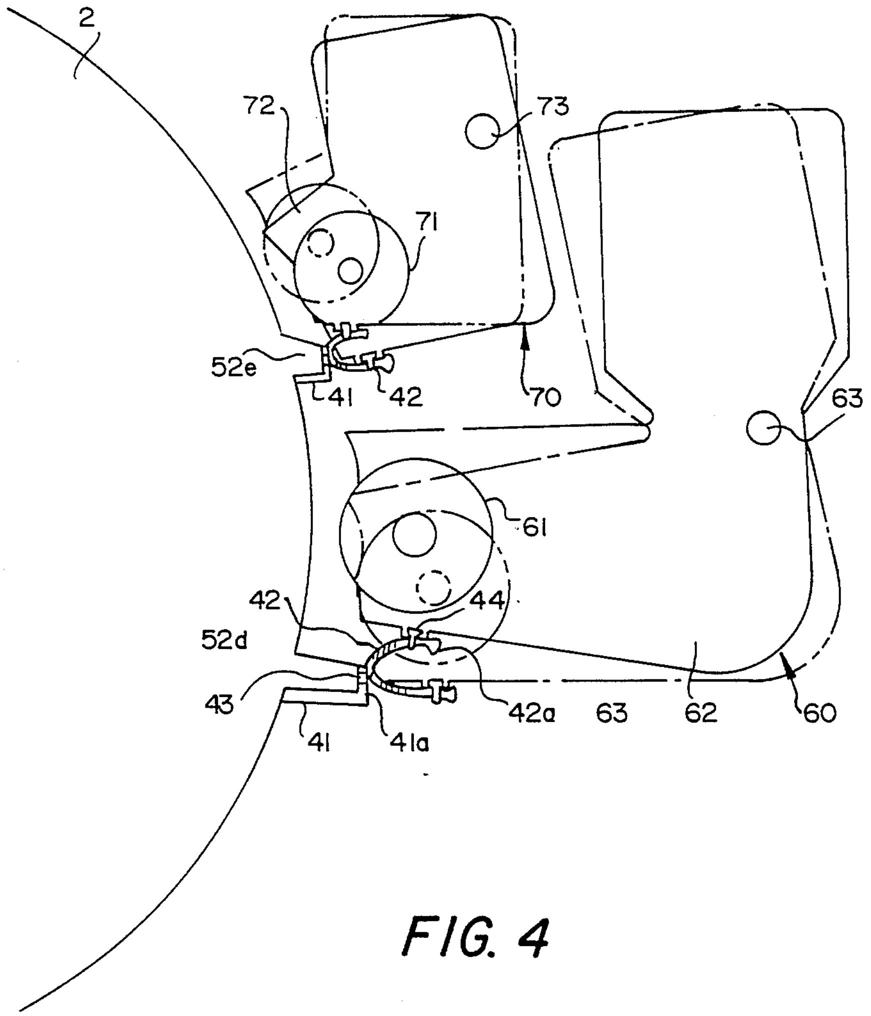
FIG. 4 is a schematic diagram showing the main portions of another image forming apparatus of the present invention.

An image forming apparatus in this embodiment is provided, as shown in FIG. 4, with a main developer unit 60 and a sub developer unit 70, like the foregoing second embodiment, each swingable between a developing position close to the photoconductor drum 51 and a receding position away therefrom. A developer collecting member 41 disposed beneath the main developer unit 60 is integrally molded with a pair of photoconductor drum supporting side plates 52 in the same way as the developer collecting members 21 and 31 in the second embodiment. The developer collecting member 41 is disposed in such a way as to connect the supporting portions **52*d* on the photoconductor drum supporting plates 52, and is provided with an upwardly extending vertical wall portion 41*a* on the side edge thereof nearer to the main developer unit 20**.

Figure 5:
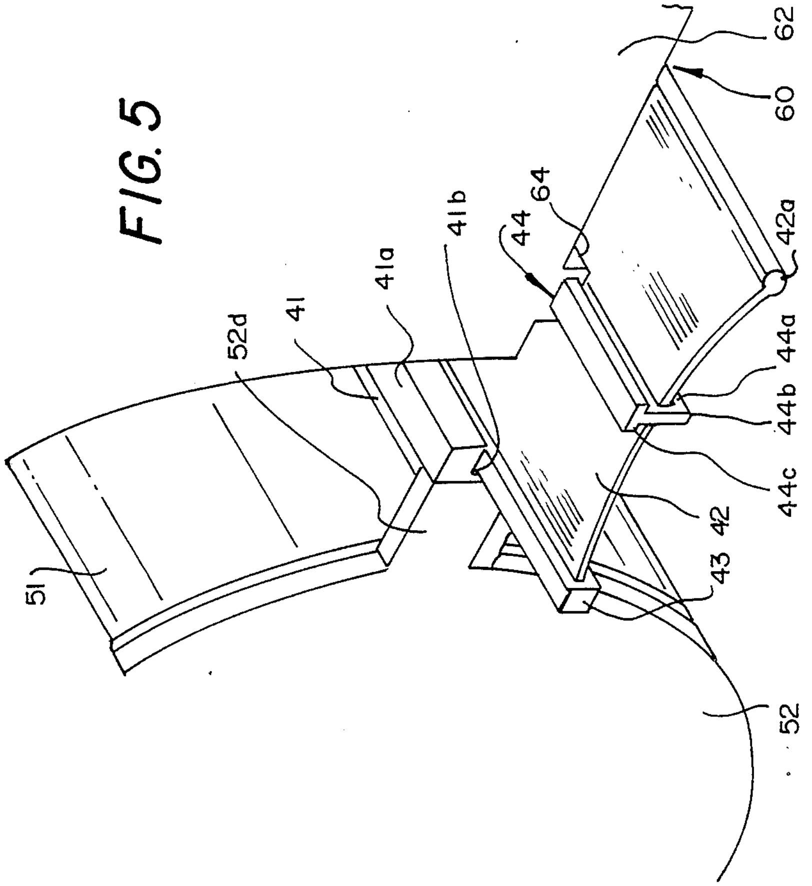
FIG. 5 is a perspective view showing a portion of FIG. 4.

As shown in FIG. 5, an outwardly open guide groove **41*b* is formed in the outer surface of the wall portion 41*a* of the developer collecting member 41 along the entire length thereof. In the guide groove 41*b* is slidably fitted a bar-like mounting guide 43 to which the base portion of the seal member 42 is fixed. The seal member 42 whose base portion is fixed to the mounting guide 43 has its entire center portion between the base portion and the edge portion supported by a supporting guide 44. The supporting guide 44 is provided with a bar-like body 44*b* having a slit opening 44*a* into which the seal member 42 is slidably inserted and a guide portion 44*c* disposed above the body 44*b* and protruding from the sides of the body 44*b*. The guide portion 44*c* is slidably fitted in a guide groove 64 disposed on the underside of the housing 62 of the main developer unit 60. The edge portion 42*a* of the seal member 42 is formed in a spherical shape so as to prevent it from being pulled out through the slit opening 44*a* in the body 44*b* of the supporting guide 44**.

A developer collecting member 41 disposed beneath the sub developer unit 70 has the same construction as above, and a seal member 42 is also constructed in the same manner and attached to the developer collecting member 41 and the developer unit 70.

The seal members 42 in this embodiment, like the foregoing second embodiment, prevent the developer falling from the clearance between the photoconductor drum 51 and the developer units 60 and 70 from being scattered downward, as well as the circulation of air therethrough. Since the seal members 42 in this embodiment are slidably connected to the respective developer units 60 and 70, the seal members 42 properly move following the movement of the respective developer units 60 and 70, when the developer units 60 and 70 are moved, thus improving the sealing effect between each of the developer units 60 and 70 and the photoconductor drum 51. Also, since the seal members 42 are slidingly mounted on, and detached from the respective developer collecting members 41, replacement of the seal members 42 is quite easy. Also, the seal members 42 are able to be removed when the developer units 60 and 70 are mounted in or detached from the apparatus, thus facilitating the mounting and detaching of the developer units 60 and 70.

Like the second embodiment, this embodiment is also applicable to an image forming apparatus having three or more developer units, for example, to a full-color image forming apparatus, and is also applicable to an image forming apparatus having a single developer unit.

Also, the developer units may be so constructed, for example, that they move reciprocally in parallel directions.

Example 4

Figure 6:
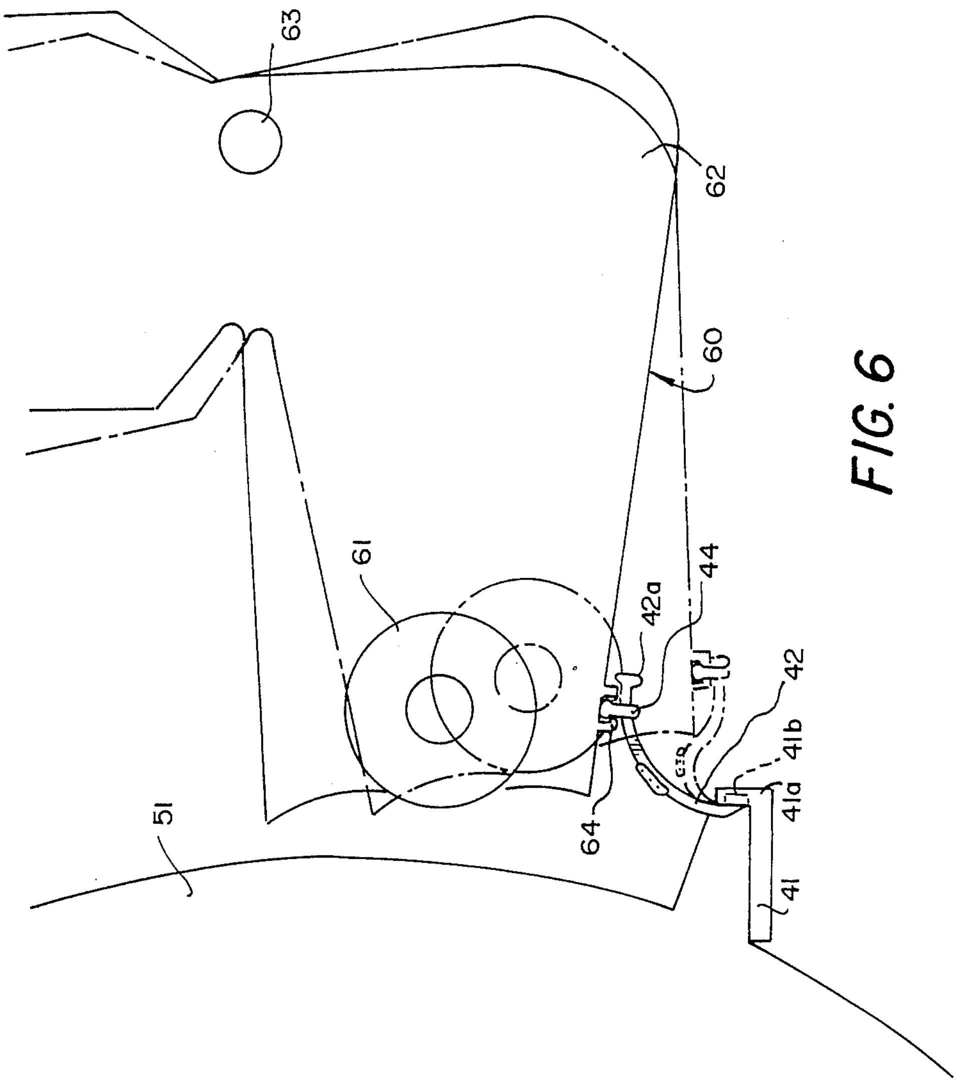
FIG. 6 is a schematic diagram showing the main portions of another image forming apparatus of the present invention.
Figure 7:
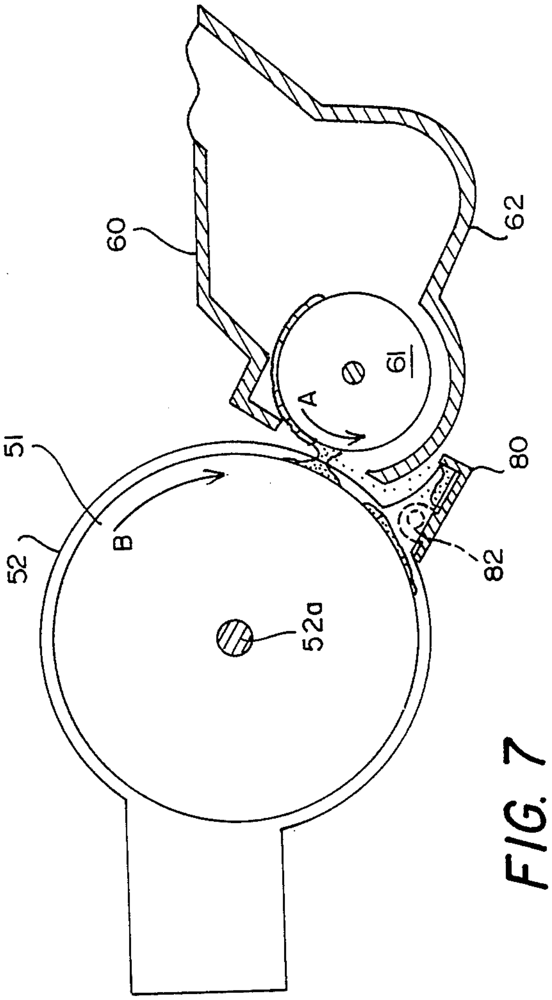
FIG. 7 PRIOR ART
FIGS. 7 and 8 respectively are schematic diagrams showing the main portions of conventional image forming apparatuses.
Figure 8:
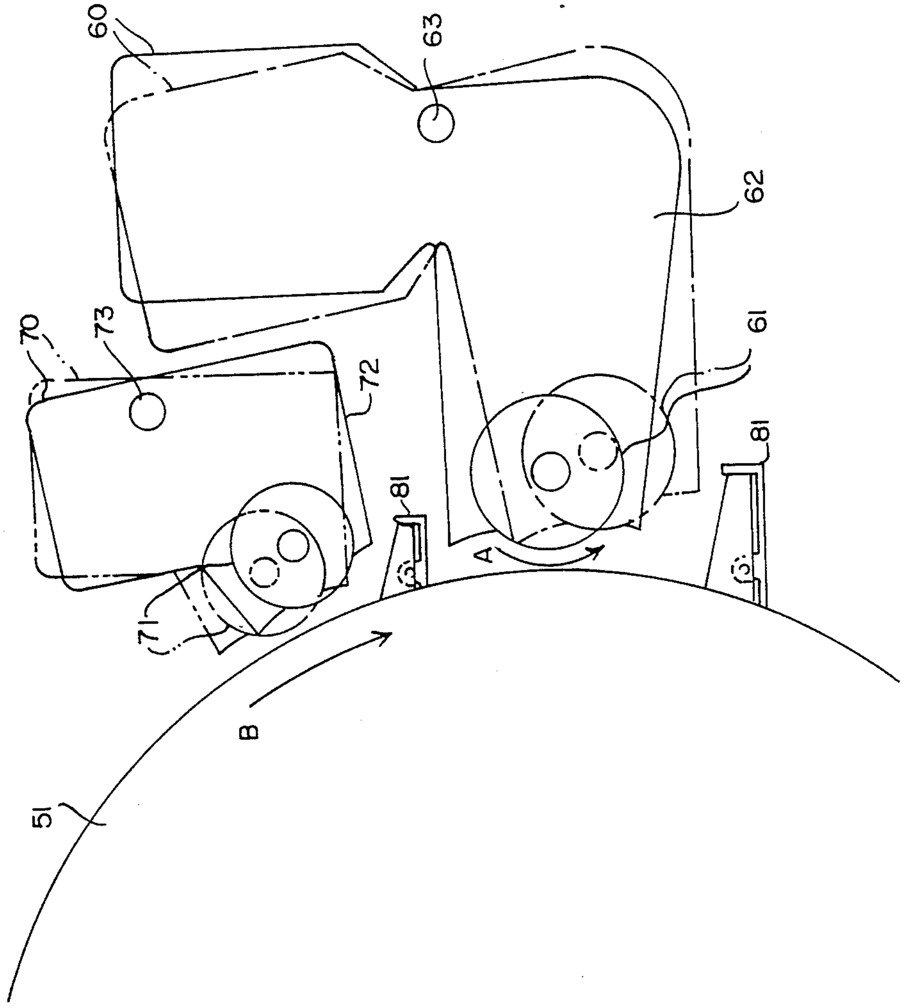
FIG. 8 PRIOR ART

An image forming apparatus in this embodiment has such a construction, as shown in FIG. 6, that a guide groove 41*b* is formed on the inner surface, the side nearer to the photoconductor drum 51, of the wall portion 41*a* of the developer collecting member 41, the base portion of the seal member 42 being detachably fitted in the guide groove 41*b*. Otherwise, the image forming apparatus in this embodiment has the same construction as that of the foregoing third embodiment.

In the image forming apparatus according to this embodiment, since the seal member 42 flexes at a greater angle, the developer falling on the seal member 42 is securely collected in the developer collecting member 41, which prevents the scattering of the developer deposited on the seal member 42 when changing the seal member 42.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An image forming apparatus for forming an image by developing a latent image on a photoconductor drum with developer delivered from a developer unit disposed facing the photoconductor drum, comprising a developer collecting member that is integrally molded with a pair of photoconductor drum supporting side plates which rotatably support the photoconductor drum, and that is disposed between the photoconductor drum supporting side plates so as to collect the developer falling from between the photoconductor drum and the developer unit.

2. An image forming apparatus according to claim 1, wherein said developer collecting member has an upwardly extending wall on the side nearer to the developer unit. .

3. An image forming apparatus according to claim 2, wherein said developer unit is movable between a developing position close to the photoconductor drum and a receding position away from the photoconductor drum, while the developer collecting member is provided with a seal member which flexes following the movement of the developer unit to always cover the clearance between the developer collecting member and the developer unit.

4. An image forming apparatus according to claim 3, wherein said seal member is attached to the outer surface, that is, the side nearer to the developer unit, of the wall of the developer collecting member.

5. An image forming apparatus according to claim 3, wherein said seal member is attached to the inner surface, that is, the side nearer to the photoconductor drum, of the wall of the developer collecting member.

6. An image forming apparatus according to claim 3, wherein said seal member is detachable from the developer collecting member.

7. An image forming apparatus according to claim 3, wherein said seal member is connected to the developer unit in a slidable way to follow the movement of the developer unit.

8. An image forming apparatus according to claim 7, wherein said seal member is detachably connected to the developer unit.

9. An image forming apparatus according to claim 4, wherein said seal member is attached to a mounting guide which is slidingly mounted on and detached from the developer collecting member.

10. An image forming apparatus according to claim 3, wherein said seal member is slidably connected to a supporting guide which is detachable from the developer unit.

11. An image forming apparatus according to claim 1, wherein said image forming apparatus is provided with a plurality of developer units, the developer collecting members being disposed beneath the respective positions at which the developer units face the photoconductor drum.

* * * * *